(No Model.) 3 Sheets—Sheet 3.
J. W. LINDQUIST.
CHECK ROW CORN PLANTER.
No. 560,908. Patented May 26, 1896.
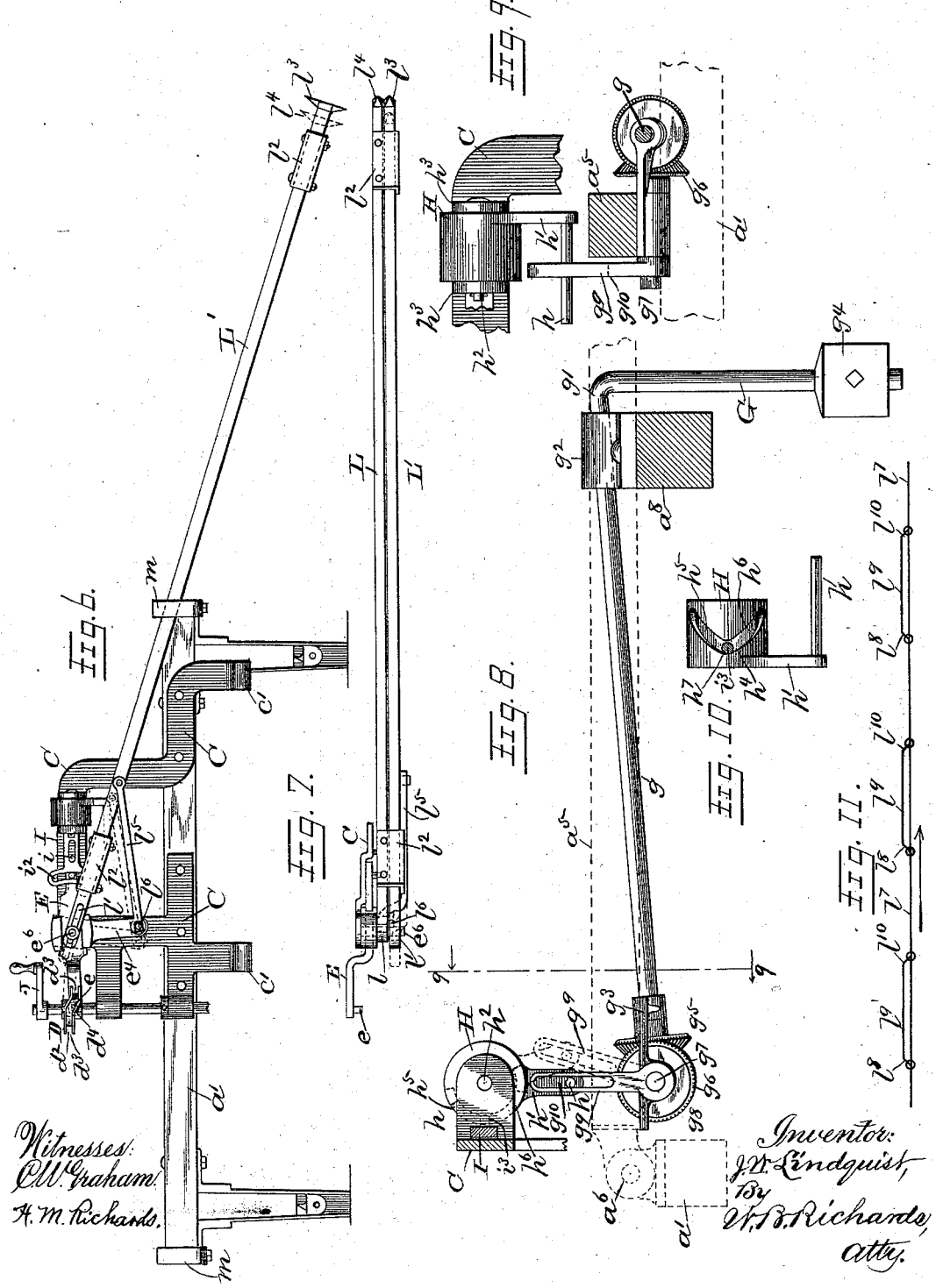
Witnesses:
C. W. Graham
H. M. Richards.
Inventor:
J. W. Lindquist,
By W. B. Richards,
Atty.

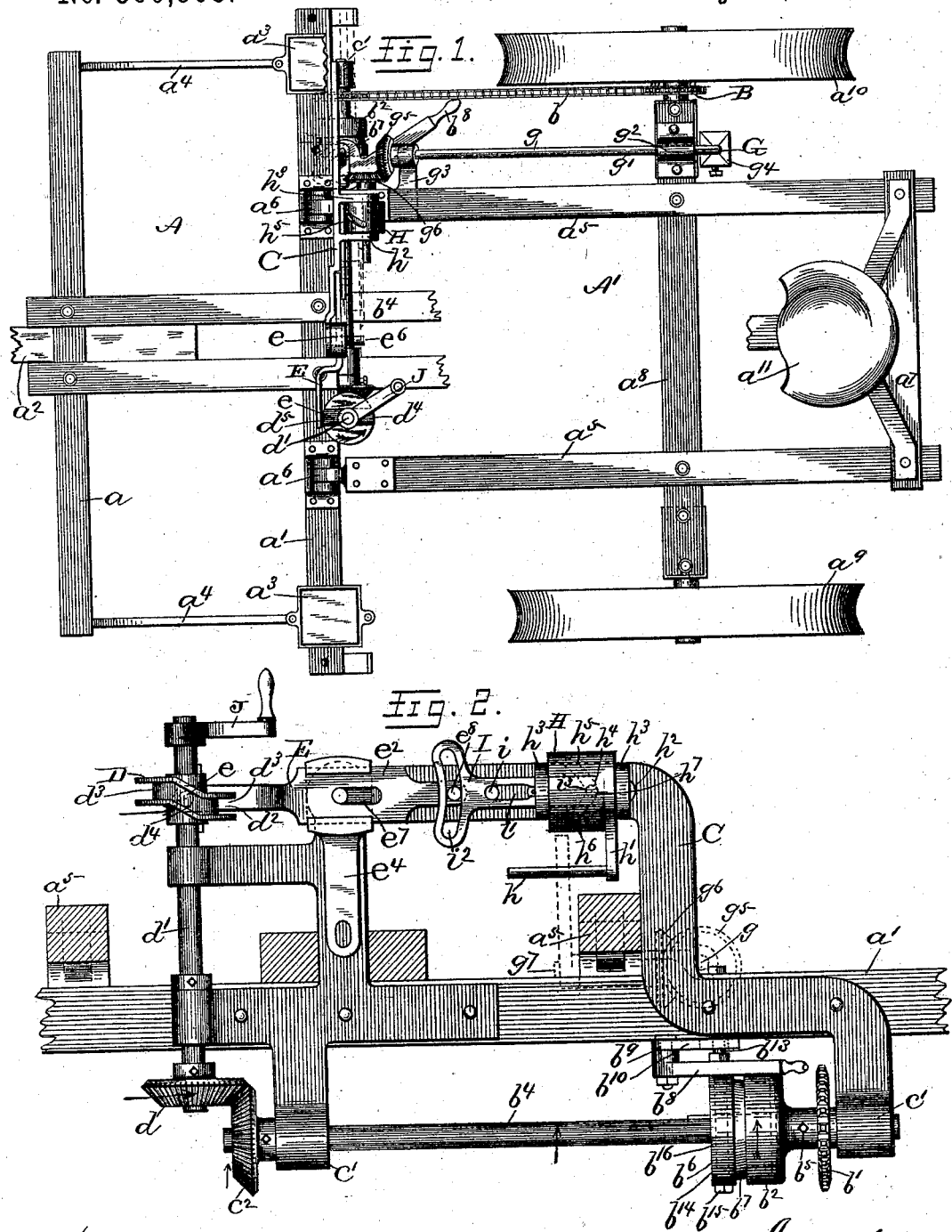

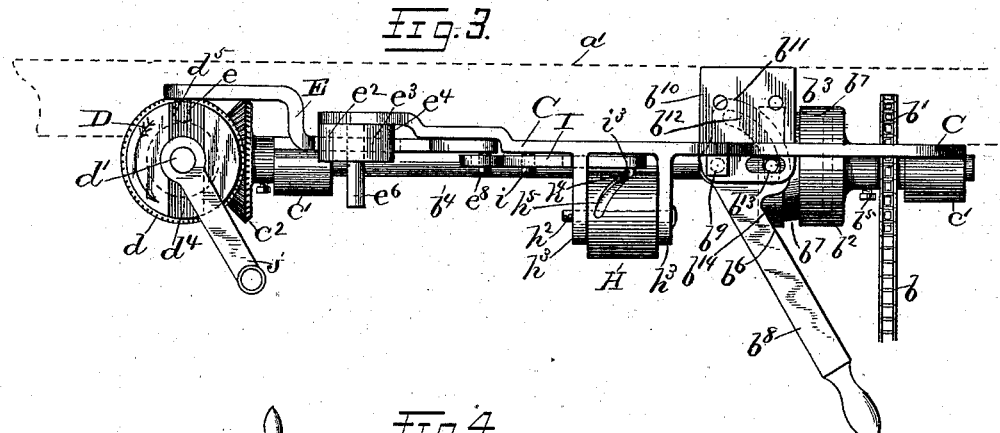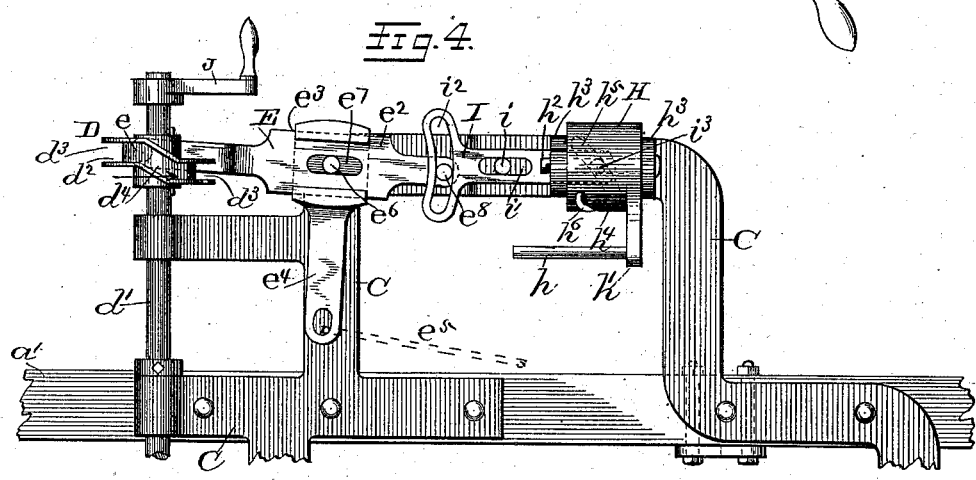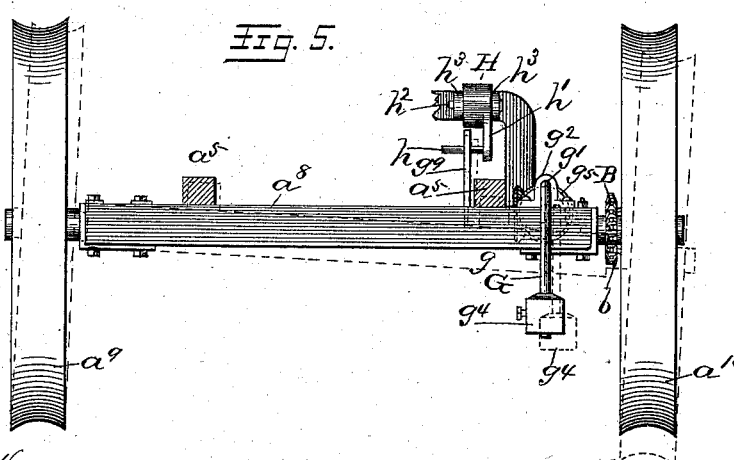

UNITED STATES PATENT OFFICE.

JOHN W. LINDQUIST, OF GALESBURG, ILLINOIS, ASSIGNOR OF ONE-HALF TO JOHN BASSLER, OF SAME PLACE.

CHECK-ROW CORN-PLANTER.

SPECIFICATION forming part of Letters Patent No. 560,908, dated May 26, 1896.

Application filed August 7, 1895. Serial No. 558,459. (No model.)

*To all whom it may concern:*

Be it known that I, JOHN W. LINDQUIST, a citizen of the United States, residing at Galesburg, in the county of Knox and State of Illinois, have invented certain new and useful Improvements in Check-Row Corn-Planters, of which the following is a specification.

The check-row corn-planter to which the invention that is herein described pertains is of that general class or type of such planters in which the seed measuring and dropping mechanism is intergeared with and operated by one or both of the planter-wheels, by the axle, or by other wheels, disks, or endless belts, which are actuated by contact with the soil and are carried or drawn by the planter.

It is a well-known fact that planters of the type or class referred to above have not been successful as check-row planters, mainly for the reason that uneven surface of the soil, irregularity in its condition, stones, bunches of roots, and other conditions of the soil become a factor in the operation of the planter, in that a wheel or endless belt traction-wheel, as the case may be, in passing over ridges or higher places, stones, roots, or other things that will raise it, and in passing over low places and soft places which will permit it to lower, will thereby cause the wheel to rotate in a given distance to a greater extent than when the planter is moved the same distance over a level and uniform surface, and that this intermittingly-increased rate of speed of rotation of the wheel will cause the seeding mechanism, which the wheel directly or indirectly operates, to deposit the charges or hills of seed at different distances apart, and thus prevent successful check-row planting or planting in rows transversely to the path of the planter.

The main object of my invention is to provide what may be termed a "governor," which will cause the seed-dropper driving wheel or wheels to impart uniform movements to the seeding mechanism in the passage of said wheel at either side of the planter over soil of different kinds, ridges, low places, stones, roots, and other conditions, rolling over which the rotary movement of the wheel in a given distance, in such planters as heretofore constructed, is increased and the speed of rotation variable and not uniform; and to the end of carrying out this main object my improvement consists in its essential or main feature in the use of a weighted pendulous rod suspended from the planter frame or axle in such manner that it may freely swing by gravity laterally of the planter, and thereby retain a vertical position when the wheel at either side of the planter in traversing the rows being planted is raised or lowered and thereby raises or lowers one side of the planter frame or axle, from which the weighted pendulous rod is suspended, into an inclined position and thereby changes the angular position of said frame or axle laterally of the planter with reference to the weighted pendulous rod, which pendulous rod is geared with the mechanism which transmits motion from the wheel or wheels to the seeding devices in such manner that it will, in changing its angular relation to said frame or to the axle, act as a governor, as hereinafter described, to prevent the excess of rotation of said wheel or wheels, which arises, as described, from disturbing the uniform action of the seeding mechanism in traversing the ground being planted, and thereby cause the charges of seed to be deposited at uniform distances apart, and consequently in substantially-accurate check-rows. This essential feature of my invention is hereinafter described and made the subject-matter of claims hereto appended, as are also other improvements which have been evolved in carrying out the essential or main feature.

A further object of my invention is to furnish an improved marker for check-row planters, which is hereinafter fully described and its novel features expressed in appended claims.

Mechanism embodying the preferred constructions and combinations of the different parts and the adjacent parts of an ordinary corn-planter in which my improvements are incorporated is illustrated in the accompanying drawings, in which—

Figure 1 is a top plan of part of an ordinary corn-planter with my improvements incorporated therewith; Fig. 2, an enlarged rear elevation of the frame on which parts of my improvement are mounted, rear elevation and transverse section of parts of the planter-frame, and rear elevation of parts of my improvement, all hereinafter described; Fig. 3, an enlarged top plan of the parts shown at Fig. 2; Fig. 4, an enlarged elevation of parts shown at Fig. 2 in different relative positions from that shown at Fig. 2; Fig. 5, a rear elevation of the axle and wheels of the planter and of the pendulous rod and other parts of my improvement; Fig. 6, substantially same elevation of parts shown at Fig. 4, and further showing the marker and its attachment to the means for operating it; Fig. 7, a top plan of the marker; Fig. 8, an enlarged side elevation of the pendulous rod and other adjacent parts and sectional elevation of other parts, as hereinafter described; Fig. 9, an enlarged sectional elevation of parts in the line 9 9 in Fig. 8; Fig. 10, an enlarged detail, an elevation showing the front side of the grooved cam; Fig. 11, a diagram indicating a top plan of a short row of hills of seed and of the marks made by the marker.

The forward frame A, Fig. 1, having transverse frame-bars $a$ $a'$, tongue $a^2$, seed-boxes $a^3$, and runners $a^4$, has the forward ends of the side frame-bars $a^5$ of the rear frame A' hinged thereto at $a^6$. The rear frame A' has transverse bar $a^7$ and is supported on the axle $a^8$, which is in turn carried on the wheels $a^9$ $a^{10}$. The seat $a^{11}$ is supported on the rear frame. The sprocket-wheel B is fixed to the wheel $a^{10}$ and geared by a sprocket-chain $b$ with a sprocket-wheel $b'$, Fig. 2, which is fixed to the boss of one member $b^2$ of a clutch $b^3$. The member $b^2$ is mounted on the shaft $b^4$ to revolve thereon while held from endwise movement thereon by a set-screw $b^5$, the inner end of which seats loosely in a circumferential groove in said shaft. The other member, $b^6$, of the clutch is splined on the shaft $b^4$ to revolve therewith and slide lengthwise thereof, and has a subconical-shaped end $b^7$, which seats in a corresponding recess in the adjacent part of the member $b^2$. The friction-clutch described is operated by a hand-lever $b^8$, pivoted at $b^9$ to a plate $b^{10}$, fixed to the bar $a'$, and has a sector-shaped end $b^{11}$, Fig. 3, with a curved slot $b^{12}$, eccentric to the center of motion $b^9$ of the hand-lever, through which slot projects the outer end part of a stud $b^{13}$, the inner end part of which is fixed to and projects through a collar $b^{14}$, and together with a stud $b^{15}$, which is also fixed to the collar $b^{14}$, rest in a circumferential groove $b^{16}$, Fig. 2, dot lines, in the outer end part of the member $b^6$ of the clutch and permit said member to revolve freely within the collar $b^{14}$, while forcing it into and out of frictional contact with the member $b^2$ by means of the lever $b^8$ in an evident manner and for the purpose of throwing the shaft $b^4$ into and out of gear with the wheel $a^{10}$.

The parts described in the last preceding paragraph, except the peculiar clutch mechanism described therein, are such parts of an ordinary corn-planter as will suffice to illustrate my improvement and its connection therewith.

The shaft $b^4$ is supported in bearings $c'$, Fig. 2, dependent from a frame C, which is fixed to the bar $a'$. A pinion $c^2$ on the shaft $b^4$ gears with a pinion $d$ on a shaft $d'$, also having bearings in arms projecting from the frame C. To the upper portion of the shaft $d'$ is fixed a cam-wheel D, or wheel having a circumferential groove in its perimeter. Diametrically opposite sides $d^3$ of the groove $d^2$ are in different planes and each in the plane of revolution of the cam-wheel D, while the intermediate sides or parts are in same inclined planes to the plane of revolution of the cam-wheel and form the cams $d^4$ $d^5$, which act, as hereinafter described, on a pin $e$, (shown in dot lines,) that projects laterally from one end part of a bar E. The mid-length part $e^2$ of the bar E is of dovetail form in its cross-section, and is freely slidable endlong of itself in a similarly-shaped groove $e^3$ across the upper end part of a lever $e^4$, to the lower end of which lever is pivotally connected a rod $e^5$, (see dot lines, Fig. 4,) which connects the oscillatory lever $e^4$ in an ordinary manner (not further shown) with the seed measuring and dropping valves (not shown) of an ordinary planter. The lever $e^4$ is pivotally mounted on a stud-pin $e^6$, which projects from the frame C through the upper end of the lever $e^4$ and through a slot $e^7$ in the bar E, which slot permits the bar E to slide back and forth endlong of itself in the dovetailed-shaped groove in the lever $e^4$, for purposes hereinafter described.

The means hereinbefore described constitute means for operating the seeding mechanism of a corn-planter by gear connection with the wheels or a wheel of the planter, and while embodying certain improvements, such as the peculiar clutch mechanism, the cam-wheel D and bar E would still be, as are all its predecessors, inefficient as a check-row planter, because the interspaces between the deposits of seed made thereby will be varied in distance by the passage of the wheel or wheels over higher or lower places, over alternating hard and mellow soil, over roots of corn, grass, or other material, and over clods or other conditions that will intermittingly increase the rotatory movements of the wheel in given distances, and I will now proceed to describe my improvement designed to correct this defect in planters in which the seed measuring and dropping mechanism is actuated by the wheel or wheels of the planter.

The horizontal end $g$ of the pendulous L-shaped bar $g'$ is journaled at its rear end part in a bracket $g^2$, supported by the axle $a^8$, and at its forward end part by a bracket $g^3$, projecting from one of the bars $a^5$, the object being simply to journal it to the axle or the frame of the planter, or to both, in such manner that its pendent or pendulous end part G, which constitutes the main feature of my invention, can and does retain a vertical position when the axle is raised or lowered at either of its ends by the wheel passing respectively over high or low places, or, as may be said, the pendulous part G swings laterally of the planter when either side of the planter is raised or lowered, as stated. A weight $g^4$ is mounted on the bar G to render its action effective and is adjustable thereon in higher or lower planes to adapt it to operate effectively under different conditions of the operating parts of the governor. The forward end of the part $g$ carries a pinion $g^5$, which gears with a pinion $g^6$, carried on a short shaft $g^7$, Fig. 8, which shaft is journaled in a bearing $g^8$, fixed to a bar $a^5$. The shaft $g^7$ carries a crank-arm $g^9$, Fig. 9, having a slot $g^{10}$, through which an arm $h$ projects, which is carried by a crank-arm $h'$, that projects from a cam-cylinder H, which is journaled on an axle $h^2$, carried by arms $h^3$, which project laterally from the frame C.

The cam-cylinder H is also an important feature in my invention in that it has a V-shaped cam-groove $h^4$ in its peripheral surface or cam-groove formed of two grooves $h^5$ $h^6$, which, starting from a common point $h^7$, extend forwardly and diverge from each other at an angle, as shown best at Fig. 10, which figure shows the opposite side of the cam-cylinder from that side shown at Figs. 2 and 4. The bar I is slidable lengthwise of itself on a stud-pin $i$, which is fixed to the frame C and extends through a slot $i'$ in said bar. A curved slot $i^2$ in the forward end of the bar I receives the stud-pin $e^8$, which projects therethrough from the adjacent end of the bar E. The walls of the curved slot $i^2$ fit snugly to the stud-pin $e^8$, so that back-and-forth or endwise-reciprocating movement of the bar I will communicate the same movement to the endwise-slidable bar E, while the bar E is permitted to oscillate freely without oscillating the bar I by reason of the pin $i$ moving in the slot $i^2$. The outer end of a stud-pin $i^3$, carried on the end of the bar I, adjacent to the cam-cylinder H, extends into the cam-grooves $h^5$ $h^6$, as shown best at Fig. 3.

In operation in the field and while the planter-wheels are in substantially the same plane the pin $i^3$ is at rest in its normal position in the cam-groove $h^4$ at the point $h^7$, where the grooves $h^5$ $h^6$ unite, as shown at Figs. 2, 3, and 10. At Fig. 5 I have by dot lines shown one of the wheels $a^{10}$ as having dropped into a low place and the inclination given the axle thereby and by which the angular relation between the axle and the pendulous rod or bar G has been changed in same way as if the pendulous bar G had been swung toward the right-hand side of the machine, thus partially rotating the rod $g$ and its pinion $g^5$, and thereby partially rotating the pinion $g^6$ and giving a throw to its crank-arm $g^9$, (see dot lines at Fig. 8,) which crank-arm in turn gives a throw or swing to the crank-arm $h'$, and thereby partially rotates the cam-cylinder H, as shown by dot lines at same figure, and in such direction that the pin $i^3$ is made to traverse the cam-groove $h^5$ toward the upper and forward end of said groove and thereby move or thrust the bar I toward the lever $e^4$, which bar I in turn and at the same time moves the bar E in the direction shown by the arrows at Figs. 2, 3, and 4, and thereby advances the pin $e$ with reference to the wheel D in the direction of motion of the adjacent side of said wheel or of the cam-groove $d^2$, said cam-groove revolving in the direction indicated by arrows at Figs. 1 and 3. This movement of the pin $e$ will be governed in extent by the distance the wheel $a^{10}$ was lowered, and hence by the increased rotary motion given the wheel in passing through said low place, and hence the movement of the pin $e$, as described, will delay the action of the inclined parts or cams $d^4$ on the pin $e$ to the same extent that the described lowering of the wheel would hasten the action of said cam-grooves $d^3$ on the pin $e$ without the use of the pendulous rod G and the intermediate parts gearing it with the cam-wheel D, and thus the dropping of charges of seed will be made at predetermined uniform distances apart and not be affected by the rising and falling movements of either wheel. The wheel $a^{10}$ in raising from the low place described will bring the axle $a^8$ and the pendulous rod G again into the same relative positions shown by full lines at Fig. 5 and in an evident manner give a reverse movement to the cam-cylinder H and rotate it to such an extent as to bring the pin $i^3$ into its normal position at the point $h^7$, and thereby give a reverse movement or throw to the bars I and E and restore the pin $e$ to its normal working relation to the wheel D.

It will be evident from the dot lines at Fig. 5 that if the left-hand wheel $a^9$ is raised by passing over corn-roots or otherwise it will incline the axle in same manner as lowering the right-hand wheel $a^{10}$, and thereby advance the pin $e$ and delay the action of the cams $d^4$ thereon in same manner as done by the described falling movement of the wheel $a^{10}$. The falling movement of the wheel $a^{10}$ and the rising movement of the wheel $a^9$ rotate the cylinder H in same direction and cause the pin $i^3$ to traverse the same cam-groove $h^5$, and the rising movements of the wheel $a^{10}$ and falling movements of the wheel $a^9$ will incline the axle in an opposite direction, and hence partially rotate the cylinder H in an opposite direction to that hereinbefore described, and thereby cause the pin $i^3$ to traverse the cam-groove $h^6$ toward its forward and outer end, and thus act on the bars I and E and pin $e$ to move them in the same direction and for the same purpose as hereinbefore described in respect to their movements given them by the cam-groove $h^5$. When the axle is inclined lowest at its end carrying the wheel $a^9$, as last described, in rising to its normal or horizontal position the cylinder H will be given a reverse partial rotation and the pin $i^3$ be made to traverse the cam-groove $h^6$ back to its normal position at the point $h^7$.

The inclined part $d^4$ or cam part of the groove $d^2$ at one side of the wheel D is such that it will raise the pin $e$ and give a throw in one direction to the lever $e^4$, while the same inclined groove $d^4$ at the diametrically opposite side of said wheel will force the pin $e$ downwardly and give the lever $e^4$ a throw in an opposite direction, thus imparting to the lever $e^4$ the necessary oscillatory movement for operating the seed slides and valves of an ordinary planter, whether such slides be of the reciprocating, oscillating, rotary, or other type.

In starting at the ends of rows or bouts, the clutch $b^3$ being first released by swinging the lever $b^8$, the driver may by means of the crank J partially rotate the shaft $d'$ and wheel D in whichever direction necessary to place the inclined parts $d^4$ of the cam-groove in position to act on the pin $e$ to operate the seed measuring and dropping mechanism in proper time for depositing the seed, in beginning the new rows, in line with or in check-row with the last deposits of seed in the last rows completed. In any part of the rows being planted the same means may be used to bring the inclined parts $d^4$ of the cam-groove $d^2$ into proper relation to the stud-pin $e$ to effect correct check-row deposits of seed when such parts, from any cause, have been thrown out of such proper relation to each other.

The pin $e^6$ passes through a hole $l$ in the inner end of the marker-bar L and through a slot $l'$ in the inner end of the marker-bar L'. The bars L L' are parallel and are held in alinement with each other by sleeves $l^2$, each of which sleeves is bolted or otherwise secured to one of said bars (as shown they are bolted to bar L) and permit the other bar to slide back and forth therethrough endwise of itself. The outer ends of the marker-bars are provided, respectively, with ordinary marker-shoes $l^3$ $l^4$. A link-rod $l^5$ is pivotally connected at one end with the bar L' a short distance from the end of said bar, and is removably connected at its other end with the lower end of the lever $e^4$ by a bolt $l^6$. By removing the nut on the bolt $l^6$ and the link-rod $l^5$ therefrom the marker-bars L L' may be turned over to the opposite side of the planter from that shown at Fig. 6, when said link-rod and nut are replaced and the marker-bars are in position for marking when the planter is traversing the ground in an opposite direction to the direction for which adjusted, as shown at Fig. 6. The marker-bars are supported by the hooks $m$ at proper operative heights.

At Figs. 6 and 7, in which the lever $e^4$, as shown by full lines, has completed its throw toward the right-hand side of the machine to effect a discharge of seed, the link-rod $l^5$ has pushed the bar L' outwardly until its outer end or shoe $l^3$ is in position to follow in the path of the shoe $l^4$ on the bar L, until the lever $e^4$ is swung toward the left-hand side of the machine to effect another discharge of seed, in making which movement the lever $e^4$, through the instrumentality of the link-rod $l^5$, will draw the rod L' and its shoe $l^3$ inwardly, as shown by dot lines at Fig. 6.

The straight line $l^7$, Fig. 11, represents the mark made by the shoe $l^4$ of the bar L. The small circles at same figure represent the deposits of seed, and if the planter is assumed to be moving in the direction indicated by arrow at said figure then the short oblique lines $l^8$ represent the marks made by the shoe $l^3$ of the bar L' as the bar L' is drawn toward the planter by the throw of the lever $e^4$ toward its dot-line position at Fig. 6. The short lines $l^9$ paralleling the line $l^7$ indicate the marks made by the shoe $l^3$ of the bar L', while the lever $e^4$ is at rest between its throws, and the oblique lines $l^{10}$ indicate the marks made by the shoe $l^3$ as the bar L' is thrust outwardly by the lever $e^4$ in making throws from its dot-line position to its full-line position. (Shown at Fig. 6.) The lines $l^7$, $l^8$, $l^9$, and $l^{10}$ all aid in indicating the last rows planted as to their course across the ground, and the marks $l^8$, $l^9$, and $l^{10}$ aid especially in rendering visible the places of deposit of the hills of seed and thereby the check-rows.

The advantages of my invention, both as to the governor for preventing rising and falling movements of the wheels from affecting the uniform distances between the charges of seed and as to the marker for indicating the place of deposit of the seeds and the line of such deposits in both directions across the field, will be apparent, and the operation will be understood from the foregoing description, it being particularly noted that while still within the purview of my invention various changes may be made in the details of construction and especially in the means for transmitting motion from the pendulous weighted rod to that part of the check-rower mechanism on which it acts.

I am aware that pendulous rods are shown in certain patents, which rods oscillate in a plane lengthwise of the planter and operate only when one end of the planter is on higher ground than its other end, and which pendulous rods are not operated at all by the rising and falling movements of the planter-wheels independently of each other in such manner as to elevate or lower one side of the planter, and I do not herein claim such as my invention, the most essential feature of my invention being a pendulous rod which swings laterally of the planter, and hence operates when either wheel is raised or lowered, as is constantly occurring in the operation of planting, and from which arises the defective check-rowing by planters in which the seed-dropping mechanism is actuated by the planter wheel or wheels.

What I claim as new is—

1. In a check-row corn-planter, in combination with seed measuring and dropping mechanism, planter-wheels, and intergear connection between one or more of said wheels and the seed measuring and dropping mechanism, for operating the same by the rotation of one or more of said wheels, a pendulous rod pivotally connected with the planter frame or axle, whereby it may swing laterally of the planter, and intermediate mechanism actuated by the pendulous rod, and acting to delay the movement of the seed measuring and discharging mechanism, substantially as described.

2. In a check-row corn-planter, in combination with seed measuring and dropping mechanism, planter-wheels, and intergear connection between one or more of said wheels and the seed measuring and dropping mechanism for operating the same by the rotation of one or more of said wheels, a pendulous rod pivotally connected with the planter frame or axle, whereby it may swing laterally of the planter when either side of the planter frame or axle is raised or lowered, substantially as described.

3. In a check-row corn-planter, in combination with seed measuring and discharging mechanism, planter-wheels and intergear connection whereby the seed measuring and dropping mechanism is actuated by one or more of said wheels, a pendulous rod pivotally connected with the planter frame or axle to swing laterally of the planter, a cam-wheel, having a cam-groove with diametrically opposite parallel sides and opposite sides inclined in opposite directions to each other, a bar slidably connected with the lever for operating the seeding mechanism and provided with a pin for traversing said cam-groove, and means for intergearing said pin-carrying bar with the pendulous rod, substantially as described.

4. In a check-row corn-planter, in combination substantially as described, seed measuring and dropping mechanism, planter-wheels, gear connection between the planter-wheels and a rotatable shaft, a cam-wheel on said shaft having a groove with parallel diametrically opposite sides, and inclined opposite sides substantially as described, and a bar adapted to oscillate the lever for operating the seed measuring and dropping mechanism and provided with a pin through which it receives movement from said cam-wheel, substantially as described.

5. In a check-row corn-planter, in combination substantially as described, an oscillatory lever for actuating the seed measuring and dropping mechanism, a bar connected with said lever and provided with a stud-pin, and a rotatory cam-wheel having a cam-groove substantially such as described, and gear connection between said cam-wheel and a wheel or wheels of the planter.

6. In a check-row corn-planter, in combination substantially as described, an oscillatory lever for actuating the seed measuring and dropping mechanism, a bar slidably connected with said lever and provided with a stud-pin, and a rotatory cam-wheel having a cam-groove substantially such as described, gear connection between said cam-wheel and a planter wheel or wheels, a pendulous rod pivotally connected with the planter frame or axle, and gear connection between said pendulous rod and a slidable bar.

7. In a check-row corn-planter, in combination substantially as described, a pendulous rod, pivotally suspended from the planter frame or axle, an oscillatory block, or cylinder with cam-grooves diverging from a common point, means connecting said block and the pendulous rod, a slidable bar with a pin which traverses said cam-groove and a curved slot for a pin on a slidable bar which is connected with the lever which actuates the seed measuring and discharging mechanism.

8. In a check-row corn-planter, and in combination with the frame carried on wheels, a pendulous rod pivotally connected with the frame or axle, whereby it may swing laterally of the planter when either wheel rises or falls in operation, substantially as described.

9. In a check-row corn-planter, in combination substantially as described, an oscillatory lever for actuating the seed measuring and dropping mechanism, a cam-wheel, as D, a gear connection between said cam-wheel and oscillatory lever, a rotatory shaft carrying said cam-wheel, gear connection between said shaft and one or more of the planter-wheels, and a crank-arm mounted on said shaft for adjusting same and the cam-wheel.

10. In a check-row corn-planter, in combination with the shafts $b^4$ $d'$, cam-wheel D, bar E and lever $e^4$, planter-wheel, and gear connection with the member $b^2$ of the clutch fixed to the shaft $b^4$, the slidable member $b^{14}$, slotted lever $b^8$, collar $b^{16}$, and set-pins $b^{13}$ and $b^{15}$, substantially as described.

11. In a check-row corn-planter, and in combination, substantially as described, seed measuring and dropping mechanism, planter-wheels, gear connection between the planter-wheels and a rotatable shaft $d'$, clutch mechanism in said gear, a wheel D having cam-grooves as described, bar E, with pins $e$ and $e^8$ slidably mounted on the lever $e^4$, pivotally-mounted pendulous weighted rod G, pinions $g^5$ and $g^6$, slotted arm $g^9$, block or cylinder H, having divergent grooves $h^5$, $h^6$ and crank-arm $h'$ with pin $h$, and slidable bar I, having a curved slot $i^2$, a pin $i^3$, and a slot $i'$ which receives the pin $i$.

12. In a check-row corn-planter, and in combination substantially as described, a rotatory cam-wheel, as D, having a cam-groove formed of parallel sides $d^3$ and inclined sides $d^4$, a bar E slidably connected with the lever $e^4$ which actuates the planter seed-slides, and provided with a pin $e$, and means for intergearing said slidable bar with, to be slid back and forth by a pendulous rod operated by the rising and falling movements of the planter wheel or wheels.

13. In a check-row corn-planter, in combination with the oscillating lever which actuates the seed measuring and dropping mechanism, marker-bars one of which bars is pivoted at its inner end on the axis or center of motion of said lever, and the other both pivotally and slidably connected with the same axis, and a link-rod connecting the outer end of said lever and the slidable marker-bar, substantially as described.

14. In a check-row corn-planter, in combination with the oscillating lever $e^4$, marker-bars L, L', the bar L pivoted to the pin $e^6$, and the bar L' both pivotally and slidably mounted on same pin, means for alining the bars L, L', and a link-rod pivotally connected at one end with the bar L' and at its other end with the free end of the lever $e^4$, substantially as described.

In testimony whereof I affix my signature in presence of two witnesses.

JOHN W. LINDQUIST.

Witnesses:
H. M. RICHARDS,
E. C. ELDER.